March 13, 1928.

A. L. HARTER

MEASURING INSTRUMENT

Filed Sept. 19, 1927

1,662,670

INVENTOR.
Arthur L. Harter,
BY
Geo. F. Kimmel, ATTORNEY.

Patented Mar. 13, 1928.

1,662,670

UNITED STATES PATENT OFFICE.

ARTHUR L. HARTER, OF KOKOMO, INDIANA.

MEASURING INSTRUMENT.

Application filed September 19, 1927. Serial No. 220,527.

This invention relates to a measuring instrument, designed primarily for use in connection with dental work, but it is to be understood that an instrument, in accordance with this invention may be employed for any purposes for which it is found applicable, and the invention has for its object to provide, in a manner as hereinafter set forth an instrument of the class referred to for measuring the position of the teeth of a person from several points of the face with reference to one definitely located point, for establishing accurate records for use in dental work, and is especially adaptable and useful in the manufacture and fitting of artificial teeth and dentures.

A further object of the invention is to provide, in a manner as hereinafter set forth, an instrument of the class referred to capable of being adjusted to the face and connected in position, and further capable of providing adjustments from several points, from the forehead and from the bridge of the nose to the teeth and chin in order that accurate measurements may be taken with reference to these two points and to establish the forehead position from that of the bridge of the nose.

Further objects of the invention are to provide, in a manner as hereinafter set forth, a measuring instrument for the purpose referred to, which is simple in its construction and arrangement, strong, durable, compact, thoroughly efficient in its use, conveniently adjusted, readily assembled, and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views.

Figure 1:
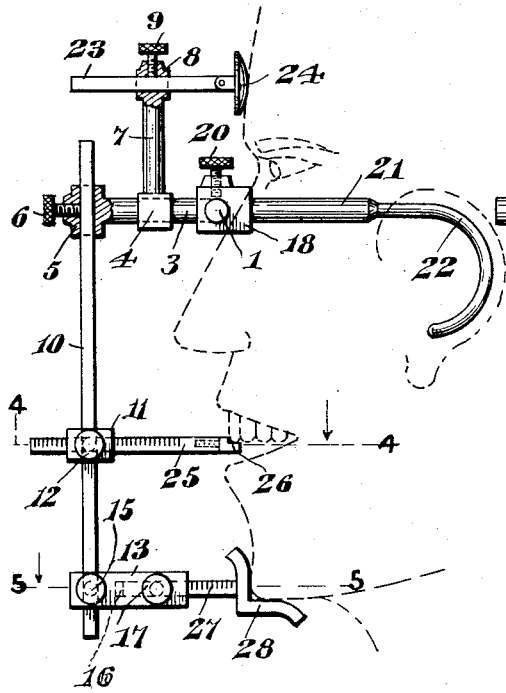
Figure 1 is a side elevation, partly in section, of a measuring instrument in accordance with this invention and showing the adaptation thereof with respect to the teeth, forehead and chin of a person.
Figure 2:
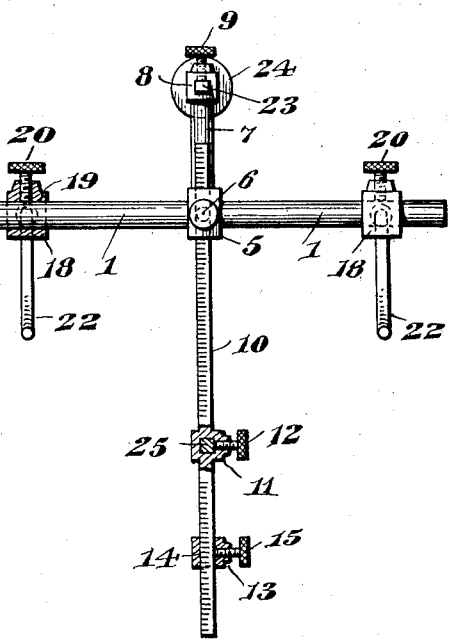
Figure 2 is a front elevation of the instrument, partly in section.
Figure 3:
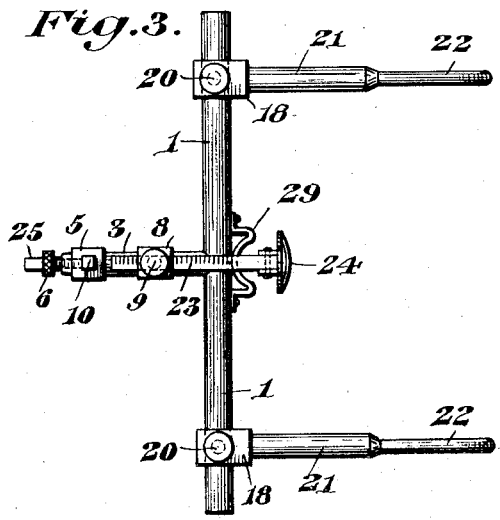
Figure 3 is a top plan view thereof.
Figure 4:
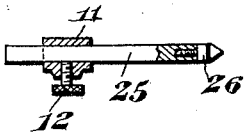
Figure 4 is a section on line 4—4 Figure 1.
Figure 5:
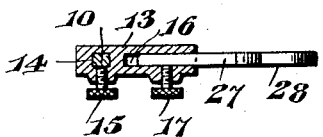
Figure 5 is a section on line 5—5 Figure 1.

Referring to the drawings in detail, a measuring instrument, in accordance with this invention, comprises a supporting member 1 in the form of a bar of appropriate length and of any desirable cross section contour and which is shown as of circular cross section. Projecting forwardly from the supporting member 1, centrally thereof, is an arm 3, provided intermediate its ends with an enlargement 4 and at its outer end with a vertically disposed tubular extension 5, carrying a set screw 6. Connected to the enlarged portion 4, of the arm 3, is a vertically disposed post 7 of appropriate length and which at its upper end is formed with a horizontally disposed tubular extension 8, carrying a set screw 9.

Adjustably connected to the vertically disposed extension 5 is a graduated bar or hanger member 10 of polygonal cross section and with the cross sectional contour of the bar 10 corresponding to the inner contour of the extension 5. The bar 10 is secured in its adjusted position by the set screw 6 and it is provided intermediate its ends, or at a point between its horizontal median and its lower end with a horizontally disposed tubular portion 11 carrying a set screw 12. The inner face of the tubular portion 11 is of polygonal contour.

Adjustably mounted on the lower end of the bar 10 and extending at right angles with respect thereto, as well as projecting inwardly therefrom, is a socket forming member 13 having a vertical opening 14 for the passage of the bar 10. The member 13 carries a set screw 15 for securing it in adjusted position to the bar 10. The member 13 is furthermore provided with a lengthwise disposed pocket 16 of polygonal contour and which opens at the inner end of said member 13 and the latter also carries a set screw 17 for a purpose to be presently referred to.

Adjustably mounted on the supporting member 1, near each end thereof is a rectangular block 18, provided with an opening 19 for the passage of the member 1. Each block 18 carries a set screw 20 for securing the blocks in adjusted position. Connected to the rear end of each block and projecting therefrom is an attaching member 21 having a curved rear end portion 22 and which depends with respect to the block 19. The curved portion 22 is of a diameter less than the remaining portion of the attaching member. The attaching members 21 are provided to associate with the ears of a person for the purpose of connecting the supporting member 1 in position with respect to the face of the person to which the instrument is applied. The attaching members 20 are lengthwise adjustable.

Adjustably connected to the extension 8, by the set screw 9, is a carrier 23 having its cross sectional contour corresponding to the inner contour of the extension 8 and said carrier 23 is in the form of a bar, which is graduated and has a curved bearing element 24 connected to its inner end and which bearing element 24 is to engage the forehead of a person. The post 7 extends in a plane parallel to the bar 10 and is stationary and of appropriate length whereby the height of the post 7 is at all times the same. When the carrier 23 is adjusted, the adjustment is such that the bearing 24 will have its curved face seat firmly against the forehead.

Adjustably connected to the tubular enlargement 11 is a graduated carrier 25 of a cross sectional contour corresponding to the inner face of the tubular portion or enlargement 11. The inner end of the carrier 25 has connected therewith an angle shaped abutment member 26 for contact with the lower side of the upper teeth of a patient.

Adjustably connected to the member 13, by the set screw 17, and extending into the socket 15, is a graduated carrier 27, of a cross sectional contour corresponding to the shape of the socket 16 and the inner end of the carrier 27 is connected to one of the arms of a substantially V-shaped abutment 28 adapted to be seated against the chin of the patient at the front and under the chin. The chin is thus held in position so that it may not be easily moved at the time of taking the reading of the teeth.

Secured to the rear of the supporting member 1, centrally thereof, is a nose bridge 29 adapted to bridge the nose of the patient when the instrument is employed for measuring purposes. The nose bridge 29 can be constructed of any suitable material and of any appropriate form. The carriers 25 and 27 can be vertically or horizontally adjusted and the carrier 23 is capable of but one adjustment and which is horizontally. The bar 24 is also vertically adjustable and when adjusted bodily carries the carriers 25 and 27 therewith. The carriers 25 and 27 are independently adjustable in a vertical position and also independently adjustable horizontally.

When the instrument is positioned firmly to the bridge of the nose, by means of the attaching members coacting with the ears, it permits accurate measurements to be made for the purpose of record, and further the instrument can be adjusted to the desired extent, the measurements being taken from the forehead by carrier 23 and from the nose bridge. The instrument can be adjusted accurately to the face thereby obtaining accurate measurements with respect to the forehead, nose bridge, bar 10, carriers 25 and 27, and at the same time permitting an accurate measurement to be taken from the bar 10 to the teeth by means of the carrier 25 and from bar 10 to the point of the chin from the carrier 27.

The instrument provides means for taking accurate measurements from a stationary position to the teeth, chin and forehead, thus permitting the manufacture and adjustment of dentures and teeth for the human mouth with more accuracy than has been heretofore obtainable. That it permits the insertion and fitting of the teeth in a natural position and is therefore of value to the manufacturing and to the practical dentist.

It is thought the many advantages of a measuring instrument, in accordance with this invention and for the purpose set forth, can be readily understood, and although the preferred embodiment of the invention is as illustrated and described, yet it is to be understood that changes in the details of construction can be had which will fall within the scope of the invention as claimed.

What I claim is:

1. A measuring instrument for the purpose set forth comprising a supporting member provided with a nose bridge, a horizontally adjustable, graduated forehead abutment element, means for connecting said element with and for spacing it from said member, a vertically and horizontally adjustable, graduated tooth abutment element positioned below said member, a vertically and horizontally adjustable, graduated chin abutment element arranged below the tooth abutment element, a vertically adjustable, graduated bar connected with said member and common to said tooth and chin abutment elements for supporting them, and a pair of attaching elements carried by said member.

2. A measuring instrument comprising superposed, adjustable, graduated forehead, tooth and chin abutment elements, a support carrying the forehead abutment element and provided with a nose bridge, a vertically adjustable graduated bar connected with said support and carrying said tooth and chin abutment elements and attaching members carried by said support.

3. A measuring instrument for the purpose set forth comprising a support provided with a nose bridge, means carried by the support for taking measurements from a stationary position to the teeth, chin and forehead, and attaching means for said support.

4. A measuring instrument for the purpose set forth comprising a support provided with a nose bridge, a series of adjustable measuring devices carried by the support for taking measurements from a stationary position to the teeth, forehead and chin, means for securing said devices in adjusted position, and attaching means for said support.

In testimony whereof, I affix my signature hereto.

ARTHUR L. HARTER.